(12) United States Patent
Schmidl et al.

(10) Patent No.: US 8,811,273 B2
(45) Date of Patent: Aug. 19, 2014

(54) TURBO HSDPA SYSTEM

(75) Inventors: Timothy M. Schmidl, Dallas, TX (US); Eko N. Onggosanusi, Allen, TX (US); Anand G. Dabak, Plano, TX (US); Aris Papasakellariou, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 2429 days.

(21) Appl. No.: 11/360,654

(22) Filed: Feb. 22, 2006

(65) Prior Publication Data

US 2006/0187876 A1 Aug. 24, 2006

Related U.S. Application Data

(60) Provisional application No. 60/655,590, filed on Feb. 22, 2005, provisional application No. 60/733,333, filed on Nov. 3, 2005.

(51) Int. Cl.
*H04W 4/00* (2009.01)

(52) U.S. Cl.
USPC .......... 370/328; 370/478; 370/347; 375/130; 375/132; 375/141; 375/148

(58) Field of Classification Search
USPC ........................................................ 370/328
See application file for complete search history.

(56) References Cited

U.S. PATENT DOCUMENTS

| | | | | |
|---|---|---|---|---|
| 6,473,467 B1* | 10/2002 | Wallace et al. | ............... | 375/267 |
| 6,904,078 B1* | 6/2005 | Abeta et al. | ............... | 375/141 |
| 6,954,481 B1* | 10/2005 | Laroia et al. | ............... | 375/132 |
| 2004/0037215 A1* | 2/2004 | Hwang et al. | ............... | 370/203 |
| 2004/0095902 A1* | 5/2004 | Laroia et al. | ............... | 370/328 |
| 2004/0166886 A1* | 8/2004 | Laroia et al. | ............... | 455/522 |
| 2004/0258134 A1* | 12/2004 | Cho et al. | ............... | 375/131 |

\* cited by examiner

*Primary Examiner* — Ayaz Sheikh
*Assistant Examiner* — Hai-Chang Hsiung
(74) *Attorney, Agent, or Firm* — Ronald O. Neerings; Frederick J. Telecky, Jr.

(57) ABSTRACT

A method of power saving for a wireless transceiver (FIGS. 1 and 2) is disclosed. The transceiver has an active power mode (504) and a reduced power mode (510). The transceiver is operated in the reduced power mode (510) and monitors transmissions from a remote wireless transmitter while in the reduced power mode. The transceiver identifies a transmission from the remote wireless transmitter by a transceiver identity included in the transmission (FIG. 6, UE identification). The transceiver transitions to the active power mode (512) in response to identifying the transmission.

10 Claims, 5 Drawing Sheets

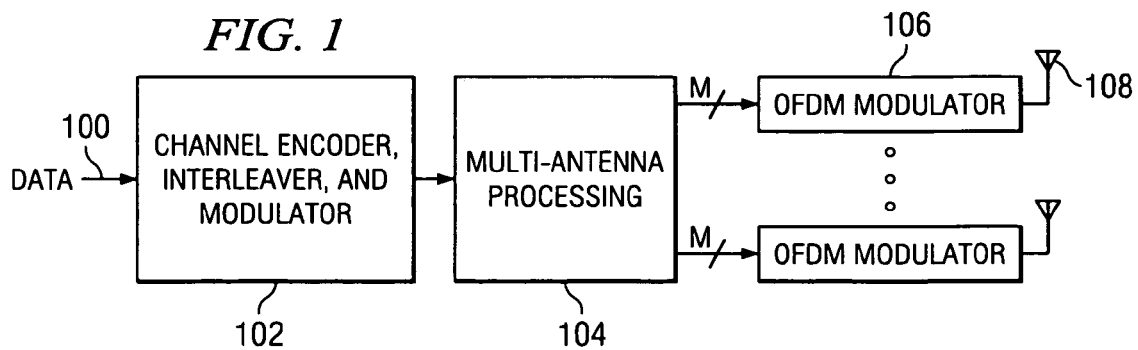
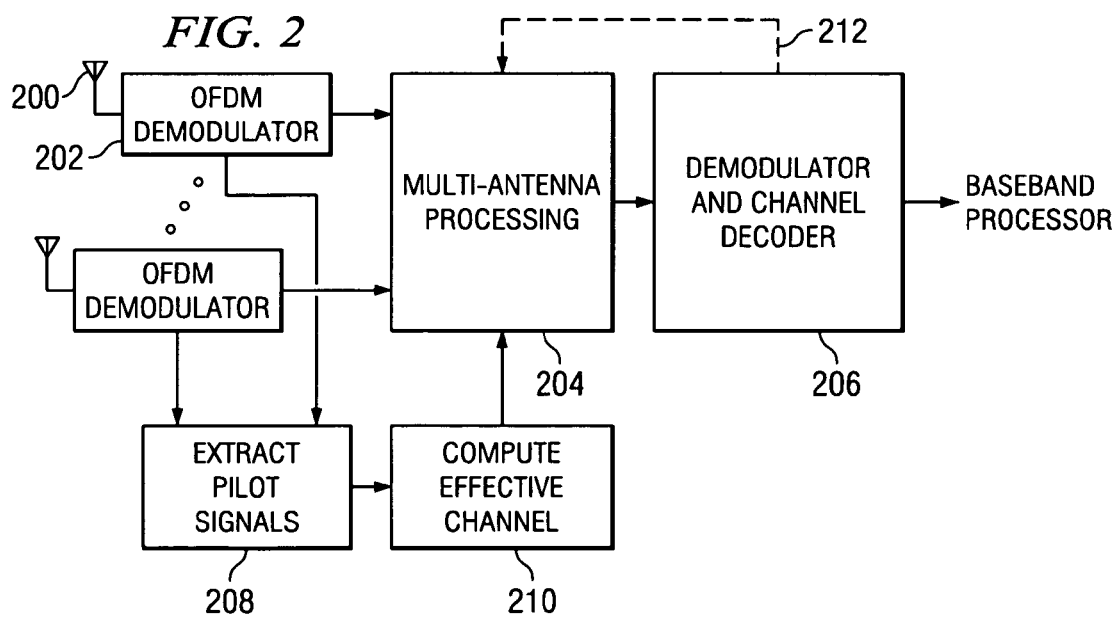

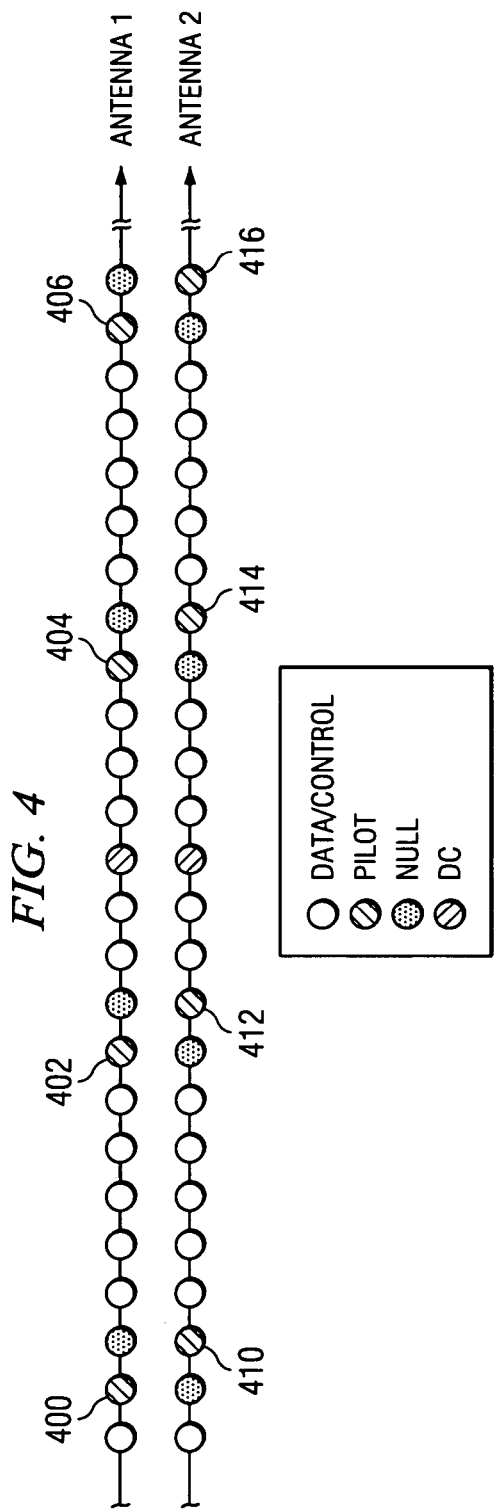

FIG. 6

| SIGNALLING/CONTROL INFORMATION | REL 99/5 CHANNEL | EQUIVALENT OFDM PHYSICAL CHANNEL | MINIMUM NUMBER OF UNCODED SIGNALLING/CONTROL BITS | |
|---|---|---|---|---|
| | | | k BITS PER SLOT | PER 0.5 ms TTI |
| TRANSMIT POWER CONTROL COMMAND (TPC) | DPCCH | OFDM-TPCCH | 7 | |
| CHANNELISATION-CODE SET | HS-SCCH | OFDM-SCCH | 7* | |
| MODULATION SCHEME | | | 12** | |
| TRANSPORT-BLOCK SIZE | | | 3 | |
| HYBRID-ARQ PROCESS NUMBER | | | 3 | |
| REDUNDANCY VERSION | | | 1 | |
| NEW DATA INDICATOR | | | | |
| UE IDENTIFICATION | | | | 16 |

\* THE NEW ANTENNA AND MODULATION SCHEME TAKES 6 BITS, VERSUS 1 BIT FOR HSDPA

\*\* THE TRANSPORT BLOCK SIZE IS 12 BITS TO ALLOW FOR TWO 6 BIT TRANSPORT BLOCK SIZES FOR TWO DIFFERENT STREAMS WHEN TWO OR FOUR ANTENNAS ARE USED

FIG. 7

| SIGNALLING/CONTROL INFORMATION | REL 99/5 CHANNEL | EQUIVALENT BCMCS PHYSICAL CHANNEL | MINIMUM NUMBER OF UNCODED SIGNALLING/CONTROL BITS | |
|---|---|---|---|---|
| CHANNELISATION-CODE SET | HS-SCCH | BCMCS-SCCH | 6 | PER 1 ms TTI |
| MODULATION SCHEME | | | 2* | |
| TRANSPORT-BLOCK SIZE | | | 6 | |
| HYBRID-ARQ PROCESS NUMBER | | | REMOVED | |
| REDUNDANCY VERSION | | | REMOVED | |
| NEW DATA INDICATOR | | | REMOVED | |
| UE IDENTIFICATION | | | REMOVED | |

* THE NEW MODULATION SCHEME TAKES TWO BITS TO SPECIFY QPSK, 16-QAM, OR 64-QAM

TURBO HSDPA SYSTEM

CROSS-REFERENCES TO RELATED APPLICATIONS

This application claims the benefit, under 35 U.S.C. §119 (e)(1), of U.S. Provisional Application No. 60/655,590, filed Feb. 22, 2005, and of U.S. Provisional Application No. 60/733,333, filed Nov. 3, 2005, and incorporated herein by this reference.

BACKGROUND OF THE INVENTION

The present embodiments relate to wireless communications systems and, more particularly, to the Long Term Evolution of High-Speed Downlink Packet Access (HSDPA) for a wireless communication system.

Wireless communications are prevalent in business, personal, and other applications, and as a result the technology for such communications continues to advance in various areas. One such advancement includes the use of spread spectrum communications, including that of code division multiple access (CDMA) which includes wideband code division multiple access (WCDMA) cellular communications. In CDMA communications, user equipment (UE) (e.g., a hand held cellular phone, personal digital assistant, or other) communicates with a base station, where typically the base station corresponds to a "cell." CDMA communications are by way of transmitting symbols from a transmitter to a receiver, and the symbols are modulated using a spreading code which consists of a series of binary pulses. The code runs at a higher rate than the symbol rate and determines the actual transmission bandwidth. In the current industry, each piece of CDMA signal transmitted according to this code is said to be a "chip," where each chip corresponds to an element in the CDMA code. Thus, the chip frequency defines the rate of the CDMA code. WCDMA includes alternative methods of data transfer, one being frequency division duplex (FDD) and another being time division duplex (TDD, where the uplink and downlink channels are asymmetric for FDD and symmetric for TDD. Another wireless standard involves time division multiple access (TDMA) apparatus, which also communicate symbols and are used by way of example in cellular systems. TDMA communications are transmitted as a group of packets in a time period, where the time period is divided into time slots so that multiple receivers may each access meaningful information during a different part of that time period. In other words, in a group of TDMA receivers, each receiver is designated a time slot in the time period, and that time slot repeats for each group of successive packets transmitted to the receiver. Accordingly, each receiver is able to identify the information intended for it by synchronizing to the group of packets and then deciphering the time slot corresponding to the given receiver. Given the preceding, CDMA transmissions are receiver-distinguished in response to codes, while TDMA transmissions are receiver-distinguished in response to time slots.

Since CDMA and TDMA communications are along wireless media, then the travel of those communications can be affected in many ways, and generally these effects are referred to as the channel effect on the communication. For example, consider a transmitter with a single antenna transmitting to a receiver with a single antenna. The transmitted signal is likely reflected by objects such as the ground, mountains, buildings, and other things that it contacts. In addition, there may be other signals that interfere with the transmitted signal. Thus, when the transmitted communication arrives at the receiver, it has been affected by the channel effect. Consequently, the originally-transmitted data is more difficult to decipher due to the added channel effect. Various approaches have been developed in an effort to reduce or remove the channel effect from the received signal so that the originally-transmitted data is properly recognized. In other words, these approaches endeavor to improve signal-to-interference+ noise ratio (SINR), thereby improving other data accuracy measures (e.g., bit error rate (BER), frame error rate (FER), and symbol error rate (SER)).

One approach to improve SINR is referred to in the art as antenna diversity, which refers to using multiple antennas at the transmitter, receiver, or both. For example, in the prior art, a multiple-antenna transmitter is used to transmit the same data on each antenna where the data is manipulated in some manner differently for each antenna. One example of such an approach is space-time transmit diversity ("STTD"). In STTD, a first antenna transmits a block of two input symbols over a corresponding two symbol intervals in a first order while at the same time a second antenna transmits, by way of example, the complex conjugates of the same block of two symbols and wherein those conjugates are output in a reversed order relative to how they are transmitted by the first antenna and the second symbol is a negative value relative to its value as an input.

Another approach to improve SINR combines antenna diversity with the need for higher data rate. Specifically, a multiple-input multiple-output (MIMO) system with transmit diversity has been devised, where each transmit antenna transmits a distinct and respective data stream. In other words, in a MIMO system, each transmit antenna transmits symbols that are independent from the symbols transmitted by any other transmit antennas for the transmitter and, thus, there is no redundancy either along a single or with respect to multiple of the transmit antennas. The advantage of a MIMO scheme using distinct and non-redundant streams is that it can achieve higher data rates as compared to a transmit diversity system.

Communication system performance demands in user equipment, however, are often dictated by web access. Applications such as news, stock quotes, video, and music require substantially higher performance in downlink transmission than in uplink transmission. Thus, MIMO system performance may be further improved for High-Speed Downlink Packet Access (HSDPA) by Orthogonal Frequency Division Multiplex (OFDM) transmission. With OFDM, multiple symbols are transmitted on multiple carriers that are spaced apart to provide orthogonality. An OFDM modulator typically takes data symbols into a serial-to-parallel converter, and the output of the serial-to-parallel converter is considered as frequency domain data symbols. The frequency domain tones at either edge of the band may be set to zero and are called guard tones. These guard tones allow the OFDM signal to fit into an appropriate spectral mask. Some of the frequency domain tones are set to values which will be known at the receiver, and these tones are termed pilot tones or symbols. These pilot symbols can be useful for channel estimation at the receiver. An inverse fast Fourier transform (IFFT) converts the frequency domain data symbols into a time domain waveform. The IFFT structure allows the frequency tones to be orthogonal. A cyclic prefix is formed by copying the tail samples from the time domain waveform and appending them to the front of the waveform. The time domain waveform with cyclic prefix is termed an OFDM symbol, and this OFDM symbol may be upconverted to an RF frequency and transmitted. An OFDM receiver may recover the timing and carrier frequency and then process the received samples through a fast Fourier transform (FFT). The cyclic prefix may be discarded and after the FFT, frequency domain information is recovered. The pilot symbols may be recovered to aid in channel estimation so that the data sent on the frequency tones can be recovered. A parallel-to-serial converter is applied, and the data is sent to the channel decoder. Just as with HSDPA, OFDM communications may be performed in an FDD mode or in a TDD mode.

While the preceding approaches provide steady improvements in wireless communications, the present inventors recognize that still further improvements may be made, including by addressing some of the drawbacks of the prior art. Examples of these improvements addressed by embodiments of the present invention include improved frequency diversity to reduce inter-cell interference, improved power control, and improved control information. Indeed, to address some of these issues, the present inventors described in co-pending U.S. patent application Ser. No. 10/230,003, filed Aug. 28, 2002, entitled, "MIMO HYBRID-ARQ USING BASIS HOPPING", and hereby incorporated herein by reference. In this referenced application, multiple independent streams of data are adaptively transmitted with a variable basis selected to improve signal quality. Further, a receiver is provided that decodes the transmitted signals including the multipaths therein. While this improvement therefore provides various benefits as discussed in the referenced application, the inventors also recognize still additional benefits that may be achieved with such systems. Accordingly, the preferred embodiments described below are directed toward these benefits as well as improving upon the prior art.

BRIEF SUMMARY OF THE INVENTION

In a first preferred embodiment, a transceiver saves power during a transmit time interval. The transmit time interval includes a plurality of OFDM symbols transmitted sequentially in time. The transceiver receives a first OFDM symbol in the transmit time interval in an active power mode. The transceiver determines if there are other OFDM symbols from the plurality of OFDM symbols for the transceiver in response to the control and pilot channels within the first OFDM symbol. The transceiver operates in the active power mode for the remainder of the transmit time interval if there are other OFDM symbols for the transceiver. The transceiver operates in a reduced power mode for a remainder of the transmit time interval if there are no other OFDM symbols for the transceiver.

In a second preferred embodiment, the transmitter forms a plurality of symbols in a packet with pilot and control signals in a first symbol of the plurality of symbols. Pilot signals are excluded from at least another symbol of the plurality of symbols. The packet is then transmitted to remote user equipment (UE).

According to a third preferred embodiment, the transmitter transmits a plurality of orthogonal frequency division multiplex (OFDM) control channels during a transmit time interval. The control channels may have different structures as defined by their size and corresponding modulation and coding scheme. The transmitter also transmits a counter during the transmit time interval to indicate a number of control channels for each structure in the transmit time interval.

According to a fourth preferred embodiment, the transmitter transmits a plurality of orthogonal frequency division multiplex (OFDM) control channels during a transmit time interval. The transmitter also transmits a counter to indicate a data block size associated with each control channel during the transmit time interval.

In a fifth preferred embodiment, the transmitter transmits a broadcast orthogonal frequency division multiplex (OFDM) signal over a plurality of broadcast channels during a transmit time interval. The transmitter also transmits a broadcast channel bitmap to indicate which channels are active.

According to a sixth preferred embodiment, a transceiver operates in an active power mode and in a reduced power mode during a communications session. The transceiver transitions to the active power mode only at predefined time intervals of the communications session. The transceiver operates at the reduced power mode for the remainder of the communications session. This may be useful and applicable for a service such as voice over internet protocol (VoIP) in which there may be periodic communication of small packets, and the control overhead can be reduced by scheduling the transmission intervals in advance. Moreover, the UE needs to monitor transmissions only at predetermined time intervals thereby conserving power for the remainder of the communications session by reverting to the reduced power mode.

Other devices, systems, and methods are also disclosed and claimed.

BRIEF DESCRIPTION OF THE SEVERAL VIEWS OF THE DRAWING

FIG. 1 is a block diagram of a transmitter that may employ embodiments of the present invention;

FIG. 2 is a block diagram of a receiver that may employ embodiments of the present invention;

FIG. 4 illustrates organization of pilot, data, and control signals of an OFDM symbol of FIG. 3;

FIG. 6 illustrates the structure of an OFDM shared control channel (SCCH) according to the present invention; and FIG. 7 illustrates the structure of an OFDM broadcast/multicast (BCMCS) shared control channel (SCCH).

DETAILED DESCRIPTION OF THE INVENTION

Figure 3:
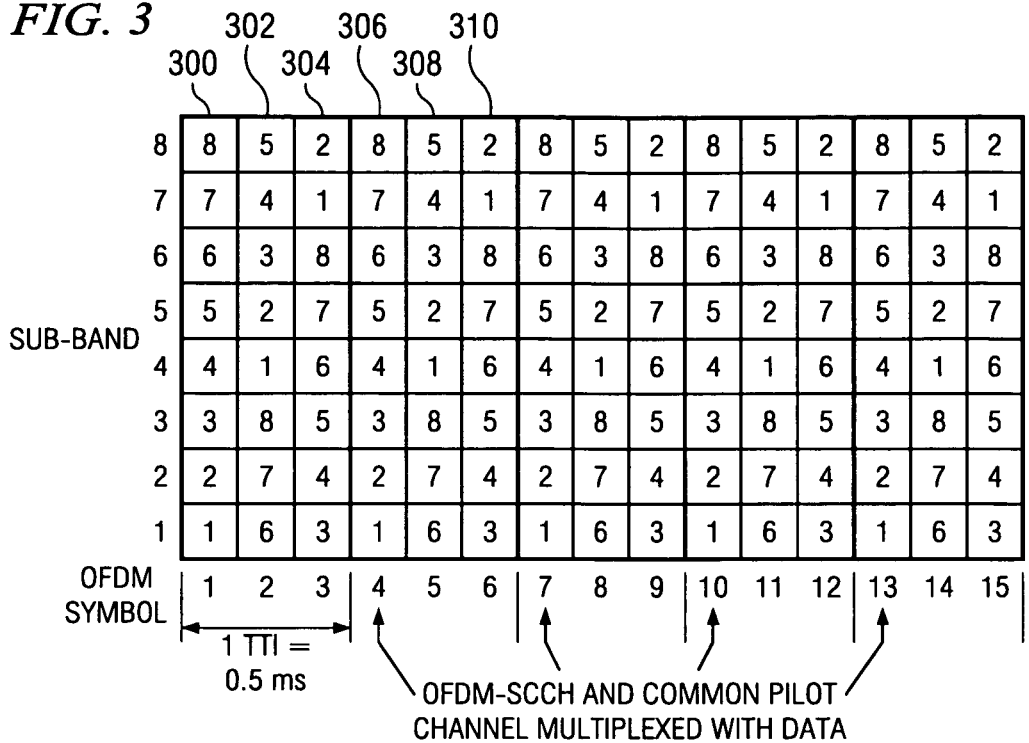
FIG. 3 illustrates multiplexed frequency allocation units of the transmitter of FIG. 1.

The preferred embodiments of the present invention provide interference reduction and power savings for a wireless communication system. The wireless communication system preferably provides for the Long Term Evolution of High-Speed Downlink Packet Access (HSDPA) and multiple-input multiple-output (MIMO) as will be explained in detail. A simplified block diagram of a wireless transmitter of the present invention for such a system is shown in FIG. 1. The wireless transmitter receives a data stream at input 100 from a baseband processor (not shown). This data stream may include pilot signals, control signals, and data signals for synchronization and control of remote wireless user equipment (UE). The data is encoded, interleaved, and modulated by circuit 102 and applied to the multiple antenna processing circuit 104. The multiple antenna processing circuit 104 can provide for spatial multiplexing or transmit diversity and performs other functions as will be described in detail. Per antenna rate control (PARC) may be performed by having multiple blocks 102 (not shown) in order to have different modulation and/or coding on each antenna stream. Transmit diversity may include open loop or closed loop modes or a combination of open and closed loop modes. Open loop modes may include STTD, which was described earlier. Closed loop modes may include transmit adaptive array (TxAA), which is a form of beamforming. In addition, double STTD or TxAA may be used with four antenna transmission when a trade-off between diversity gain and spatial multiplexing is desired. The output of multiple antenna processing circuit 104 is then applied to the OFDM modulation circuits 106 and transmitted by transmit antennas 108. Preferred embodiments of the present invention may include one, two, four, or more transmit antennas 108. Thus, OFDM modulation circuits 106 receive multiple inputs and produce multiple outputs.

Referring to FIG. 2, there is a simplified block diagram of a wireless receiver of the present invention. Inventive features of the transmitter of FIG. 1 are included in the receiver for compatibility. Antennas 200 receive signals from a remote transmitter as in FIG. 1. In a preferred embodiment, there are 1, two, four, or more antennas 200. Signals from antennas 200 are applied to OFDM demodulator circuit 202. The output of OFDM demodulator circuit 202 is applied to circuit 208 to extract pilot signals that are used to synchronize the receiver with the remote transmitter. These pilot signals may have a power boost relative to data signals. The extracted pilot signals are applied to circuit 210 to compute the effective channel between the receiver and remote transmitter. The outputs of OFDM demodulator circuit 202 are applied to the multi-antenna processing circuit 204 and corrected by the effective channel estimate from circuit 210. Different types of multi-antenna processing can be used such as linear, decision feedback, or maximum likelihood. These signals are subsequently converted to a serial data stream as will be explained with reference to FIG. 3. The serial data stream is then demodulated and, decoded in circuit 206, and applied to a baseband processor. An optional feedback loop 212 from circuit 206 to circuit 204 allows a decision feedback operation which can improve the estimation of data bits.

Referring now to FIG. 3, there is a diagram showing the exemplary structure of an HSDPA packet produced by multi-antenna processing circuit 104 of FIG. 1. For the purpose of illustration, there are five separate packets in the diagram of FIG. 3. In this exemplary embodiment each packet includes three OFDM symbols shown in columns. However, the packet may comprise a different number of OFDM symbols. The first OFDM symbol includes a shared control channel (SCCH) and common pilot channel multiplexed with data. For example, the first packet includes OFDM symbols 300, 302, and 304. The second packet includes OFDM symbols 306, 308, and 310. Each group of three OFDM symbols is transmitted in a respective transmit time interval (TTI). For the purpose of illustration, each TTI has duration of 0.5 milliseconds. Each OFDM symbol includes eight sub-bands. These sub-bands provide frequency diversity within each OFDM symbol of the wireless communication system. According to the present invention the order of these sub-bands in the first OFDM symbol, for example symbol 300, is randomly selected. The order of sub-bands in each remaining OFDM symbol is obtained by a cyclic shift of the order of the first OFDM symbol. For example, sub-bands of OFDM symbol 302 are shifted five positions so that the position of sub-band 8 in OFDM symbol 302 corresponds to the position of sub-band 3 in OFDM symbol 300. Sub-bands of OFDM symbol 304 are shifted another five positions so that the position of sub-band 8 in OFDM symbol 304 corresponds to the position of sub-band 6 in OFDM symbol 300. Added frequency diversity of this sub-band packet structure advantageously reduces inter-cell interference by averaging the interference over different sub-bands. This increases the SINR within the cell and is particularly improves communication at high Doppler rates.

Recall from the discussion of FIG. 3 that the first OFDM symbol of each packet includes a shared control channel (SCCH) and common pilot channel multiplexed with data. By way of example, the diagram of FIG. 4 illustrates individual tones or discrete frequencies that modulate the sub-bands for the first OFDM symbol in each packet for the case of two transmit antennas. Substantially all pilot signals and control signals are included in the first OFDM symbol of each packet. Alternatively, for a four antenna system, a similar structure may be necessary for the first two OFDM symbols of each packet. Preferably at least one or more subsequent OFDM symbols in the packet would be reserved for data signals not including pilot signals or control signals. For example, pilot signals 400-406 in the first OFDM symbol 300 (FIG. 3) are transmitted from a first antenna. Pilot signals 410-416 in the first OFDM symbol 300 are transmitted from a second antenna. This organization of pilot and control signals advantageously promotes rapid synchronization of user equipment (UE) in a cell with a base station. Each UE may monitor control signals and determine whether a particular packet includes any data for that UE. When a particular UE determines that the packet does not include relevant data, the UE may enter a low power mode of operation for the remainder of the transmit time interval (TTI). For example, with the packet structure of FIG. 3, each UE would monitor a first OFDM symbol 300 in a first packet. Each UE in the cell that found its UE identity in the control information would continue to monitor the remaining OFDM symbols 302 and 304 to process relevant data. However, any UE that did not detect its UE identity in the control information would enter a low power state for the remaining TTI. Thus, significant power is conserved by each UE in the cell when no relevant data is included in packets.

Because there are a limited number of tones available in the first OFDM symbol, the shared control channel may be split into two parts. In one embodiment, the UE identities may be transmitted as part of the shared control channel in a common part and transmitted in the first OFDM symbol. The UE dedicated scheduling information may be transmitted in a dedicated part of the shared control channel and transmitted in the first and second OFDM symbols or, alternatively, throughout the TTI. UE dedicated scheduling information may contain information related to the Hybrid-ARQ process, the modulation and coding scheme, the transport format, or other features. This split of the SCCH into common and dedicated parts allows the UE to save power. The common and dedicated parts of the SCCH preferably have different code rates. The UE may monitor the first OFDM symbol. If the UE identity is not contained in the first OFDM symbol, the UE does not need to process the rest of the OFDM symbols in the TTI. With reference to FIG. 3, for example, the UE identities may be contained in the control channel transmitted in the first OFDM symbol 300, while the remainder of the shared control channel may be transmitted in OFDM symbols 300 and/or 302.

The foregoing discussion with regard to FIGS. 3 and 4 is by way of example only. For example, power saving advantages of the present invention will be even greater for more OFDM symbols in each TTI. A longer TTI would permit each UE to enter a reduced power mode for greater periods of time, thereby conserving even more power when a packet contained no relevant data. However, additional pilot signals may be necessary for any UE that does receive relevant data during the TTI. These additional pilot signals may be included in at least another OFDM symbol within the longer TTI so that circuits 208 and 210 (FIG. 2) may update the channel estimate.

Figure 5:
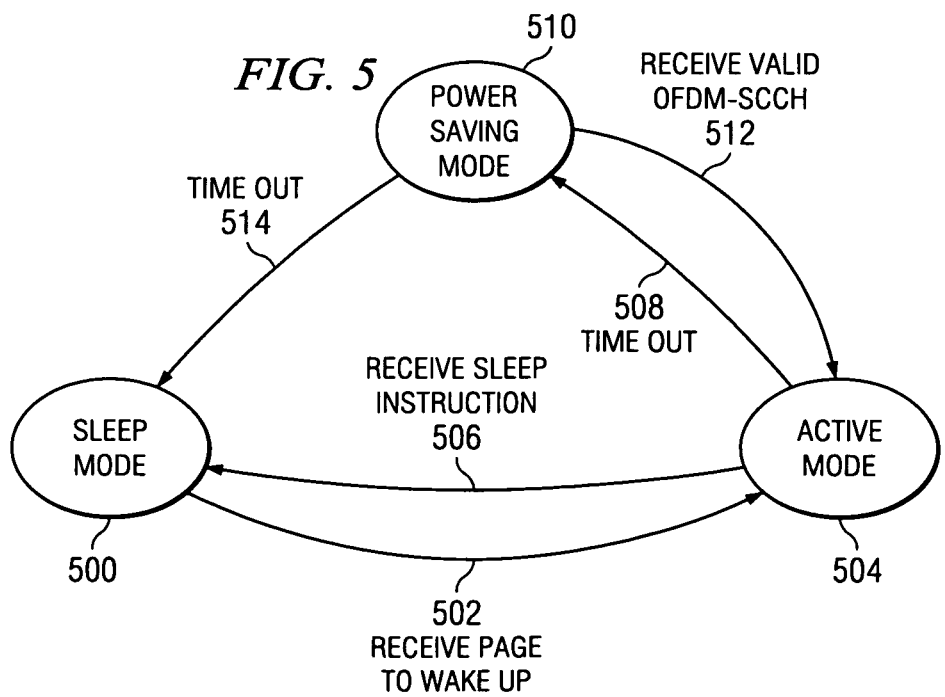
FIG. 5 is a state diagram of power control modes of the present invention.

Given the above, FIG. 5 illustrates three operational modes of a typical UE in the cell. Active mode 504 is a normal operational mode in which the UE transmits and receives data. When the UE does not receive a transmission for a first predetermined time after a most recent transmission from the base station, it transitions to a power saving mode 510 as shown by path 508. If the UE still does not receive a transmission for a second predetermined time after a most recent transmission from the base station, it transitions to a sleep mode 500 as shown by path 514. The sleep mode 500 produces an even greater power savings than the power saving mode 510. However, the UE must then receive a page from the base station to power up and return to the active mode 504 along path 502. Alternatively, if the UE receives a valid transmission over the SCCH while in the power saving mode 510 before elapse of the second predetermined time, it returns to active mode 504 along path 512. Furthermore, from active mode 504, the UE may also receive a sleep instruction and move directly to sleep mode 500 as illustrated by path 506. In this manner, each EU in the cell conserves significant power but remains responsive to subsequent packet transmissions.

In an alternative embodiment of FIG. 5, the UE transitions from active mode 504 to power saving mode 510 as shown by path 508 for a predetermined time after it receives a transmission. This predetermined time is preferably an integral number of transmit time intervals. After this predetermined time, the UE transitions back to the active mode 504 along path 512. This embodiment of the present invention advantageously reduces control signal overhead between the base station and the UE and maintains the power saving features of the previous embodiment.

In an embodiment of the present invention, the base station transmits a counter during each TTI to indicate a number of shared control channels (SCCH) in the TTI. There is generally one SCCH for each UE. The UE depends on a UE identification field in the OFDM SCCH for identification. The counter may have several values. Each value is associated with a particular shared control channel size. For example, a first counter value of two may indicate two shared control channels of a first size. A second counter value of three may indicate three shared control channels of a second size. In another embodiment of the present invention the base station transmits a power control counter during each TTI to indicate a number of power control bits in the TTI.

In another embodiment of the present invention, the base station transmits a block size designator during each TTI. The block size designator advantageously provides flexible block sizes to accommodate a variable number of shared control channels and other control information in each TTI.

Turning now to FIG. 6, there is a diagram of the OFDM SCCH structure illustrating features of the present invention. The diagram identifies each particular control feature of the SCCH in the left column. Corresponding control bits associated with each control feature are given in the right column. For example, multiple power control bits are transmitted during each TTI on the OFDM transmit power control channel (TPCCH). A modulation scheme is transmitted in 7 bits during the TTI. The modulation scheme preferably identifies the modulation format and antenna grouping. For example, the modulation formats may include quadrature phase shift keying (QPSK), 16-quadrature amplitude modulation (16-QAM), or 64-quadrature amplitude modulation (64-QAM). The selected modulation format would typically depend on signal quality and desired data rate. Moreover, the modulation format may be different for each antenna and each UE. The block size identifier designates the variable block size within the TTI. The Hybrid-ARQ field identifies the automatic repeat request (ARQ) format to each UE. In response to a transmission from the base station, the UE will acknowledge (ACK) or not acknowledge (NACK) receipt of the transmission. The UE identification field identifies the SCCH corresponding to a specific UE as previously discussed.

Referring now to FIG. 7, there is a diagram of a broadcast/multicast (BCMCS) SCCH structure illustrating features of the present invention. As with FIG. 6, the diagram identifies each particular control feature of the SCCH in the left column. Corresponding control bits associated with each control feature are given in the right column. However, the broadcast channels are generally only monitored by the UE much as one might watch television. Thus, several control features such as Hybrid-ARQ, Redundancy, New-data indicator, and UE identification are unnecessary. Furthermore, no power control bits are transmitted in the BCMCS slots and each BCMCS transmit time interval (TTI) is preferably 1.0 millisecond. According to the present invention, the base station transmits a bitmap in each TTI to indicate which BCMCS data streams are active. For example, if the BCMCS accommodates a maximum of 12 data streams, a 12-bit bit map is transmitted during each TTI. A value of 0 indicates a data stream is inactive, and a value of 1 indicates the data stream is active. Thus, the UE may check the bitmap to determine which data stream to monitor. This advantageously eliminates a need to monitor all data streams of the BCMCS. Moreover, the UE may also identify which BCMCS shared control channels (SCCH) to ignore. This is because the shared control channels are transmitted sequentially and correspond to the order of the bitmap.

Still further, while numerous examples have thus been provided, one skilled in the art should recognize that various modifications, substitutions, or alterations may be made to the described embodiments while still falling with the inventive scope as defined by the following claims.

What is claimed is:

1. A method of transmitting symbols, comprising the steps of:
   forming a plurality of symbols in a packet;
   forming pilot and control signals in a first symbol of the plurality of symbols;
   excluding all pilot signals and control signals from at least another symbol of the plurality of symbols; and
   transmitting the packet.

2. A method as in claim 1, comprising the step of forming pilot and control signals in a second symbol of the plurality of symbols, wherein the second symbol is adjacent in time to the first symbol.

3. A method as in claim 1, wherein the step of transmitting comprises transmitting the packet during a transmit time interval (TTI).

4. A method as in claim 1, wherein each symbol of the plurality of symbols is an orthogonal frequency division multiplex (OFDM) symbol.

5. A method as in claim 1, wherein a transmit power for the pilot signals is greater than a transmit power for the control signals.

6. A method of communicating with a wireless transceiver, comprising the steps of:
   receiving a plurality of symbols in a packet;
   receiving pilot and control signals in a first symbol of the plurality of symbols;
   receiving data signals excluding all pilot signals and control signals from at least another symbol of the plurality of symbols; and
   decoding the packet.

7. A method as in claim 6, comprising the step of receiving pilot and control signals in a second symbol of the plurality of symbols, wherein the second symbol is adjacent in time to the first symbol.

8. A method as in claim 6, wherein the step of receiving a plurality of symbols in a packet comprises receiving the packet during a transmit time interval (TTI).

9. A method as in claim 6, wherein each symbol of the plurality of symbols is an orthogonal frequency division multiplex (OFDM) symbol.

10. A method as in claim 6, wherein a transmit power for the pilot signals is greater than a transmit power for the control signals.

\* \* \* \* \*